US008990495B2

(12) United States Patent
Hallak et al.

(10) Patent No.: US 8,990,495 B2
(45) Date of Patent: Mar. 24, 2015

(54) METHOD AND SYSTEM FOR STORING DATA IN RAID MEMORY DEVICES

(75) Inventors: Renen Hallak, Tel-Aviv (IL); Yaron Segev, RaAnana (IL)

(73) Assignee: EMC Corporation, Hopkinton, MA (US)

( * ) Notice: Subject to any disclaimer, the term of this patent is extended or adjusted under 35 U.S.C. 154(b) by 599 days.

(21) Appl. No.: 13/296,334

(22) Filed: Nov. 15, 2011

(65) Prior Publication Data

US 2013/0124776 A1 May 16, 2013

(51) Int. Cl.
*G06F 12/00* (2006.01)
*G06F 11/10* (2006.01)
(52) U.S. Cl.
CPC .... *G06F 11/1092* (2013.01); *G06F 2211/1057* (2013.01)
USPC .................................. 711/114; 711/E12.103
(58) Field of Classification Search
USPC .......................................... 711/114, E12.103
See application file for complete search history.

(56) References Cited

U.S. PATENT DOCUMENTS

| 5,301,297 | A | * | 4/1994 | Menon et al. ................. 711/114 |
| 5,453,998 | A | * | 9/1995 | Dang ............................ 714/805 |
| 5,603,001 | A | * | 2/1997 | Sukegawa et al. ............ 711/103 |
| 6,158,017 | A | * | 12/2000 | Han et al. ..................... 714/6.24 |
| 6,871,317 | B1 | * | 3/2005 | Corbett ......................... 714/800 |
| 6,993,701 | B2 | * | 1/2006 | Corbett et al. ................ 714/770 |

* cited by examiner

*Primary Examiner* — Larry Mackall
(74) *Attorney, Agent, or Firm* — Krishnendu Gupta; Konrad R. Lee

(57) ABSTRACT

A redundant array of independent disk (RAID) memory storage system comprising data storage blocks arranged in a first plurality of data rows and a second plurality of data columns, wherein parity data is stored in additionally defined parity blocks, and wherein numbers of data blocks in respective columns are different, to accommodate the additional diagonal parity data block that the geometry of the system requires. The system is suitable for an SSD array in which sequential disk readout is not required.

26 Claims, 20 Drawing Sheets

| Data Disk 1 | Data Disk 2 | Data Disk 3 | Data Disk 4 | Data Disk 5 | Row Parity Disk 0 | Row Parity Disk 1 | Diagonal Parity Disk |
|---|---|---|---|---|---|---|---|
| <1.0, 5> | <1.0, 6> | <1.1, 7> | <1.1, 8> | <1.1, 9> | ⊕1.0 | ⊕1.1 | ⊕5 |
| <2.0, 6> | <2.0, 7> | <2.1, 8> | <2.1, 9> | <2.1, 5> | ⊕2.0 | ⊕2.1 | ⊕6 |
| <3.0, 7> | <3.0, 8> | <3.1, 9> | <3.1, 5> | <3.1, 6> | ⊕3.0 | ⊕3.1 | ⊕7 |
| <4.0, 8> | <4.0, 9> | <4.1, 5> | <4.1, 6> | <4.1, 7> | ⊕4.0 | ⊕4.1 | ⊕8 |
|  |  |  |  |  |  |  | ⊕9 |

| D0 | D1 | D2 | D3 | D4 | P | Q |
|---|---|---|---|---|---|---|
| Data | Data | Data | Data | Data | Redundancy | Redundancy |
| Data | Data | Data | Data | Data | Redundancy | Redundancy |
| Data | Data | Data | Data | Data | Redundancy | Redundancy |
| Data | Data | Data | Data | Data | Redundancy | Redundancy | k = 5 (covering D0–D4)

Fig. 1 Prior Art

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | <1, 9> | ⊕1 | ⊕5⊕9 |
| <2, 6> | <2, 7> | <2, 8> | <2, 9> | <2, 5> | ⊕2 | ⊕6⊕9 |
| <3, 7> | <3, 8> | <3, 9> | <3, 5> | <3, 6> | ⊕3 | ⊕7⊕9 |
| <4, 8> | <4, 9> | <4, 5> | <4, 6> | <4, 7> | ⊕4 | ⊕8⊕9 |

Fig. 2 Prior Art

| Data Disk 1 | Data Disk 2 | Data Disk 3 | Data Disk 4 | Row Parity Disk | Diagonal Parity Disk |
|---|---|---|---|---|---|
| <1, 5> | <1, 6> | <1, 7> | <1, 8> | <⊕1, -> | ⊕5 |
| <2, 6> | <2, 7> | <2, 8> | <2, -> | <⊕2, 5> | ⊕6 |
| <3, 7> | <3, 8> | <3, -> | <3, 5> | <⊕3, 6> | ⊕7 |
| <4, 8> | <4, -> | <4, 5> | <4, 6> | <⊕4, 7> | ⊕8 |

Fig. 3 Prior Art

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | <1, 9> | ⊕1 | ⊕5 |
| <2, 6> | <2, 7> | <2, 8> | <2, 9> | <2, 5> | ⊕2 | ⊕6 |
| <3, 7> | <3, 8> | <3, 9> | <3, 5> | <3, 6> | ⊕3 | ⊕7 |
| <4, 8> | <4, 9> | <4, 5> | <4, 6> | <4, 7> | ⊕4 | ⊕8 |
| | | | | | | ⊕9 |

Fig. 6

|     | S1 | S2 | S3 | S4 | S5 | S6 | S7 |
| --- | --- | --- | --- | --- | --- | --- | --- |
|     | Q  | D  | D  | D  | D  | D  | P  |
|     | P  | Q  | D  | D  | D  | D  | D  |
|     | D  | P  | Q  | D  | D  | D  | D  |
|     | D  | D  | P  | Q  | D  | D  | D  |
|     | D  | D  | D  | P  | Q  | D  | D  |
|     | D  | D  | D  | D  | P  | Q  | D  |
|     | D  | D  | D  | D  | D  | P  | Q  |

Fig. 10

| D0 | D1 | D2 | D3 | D4 | P | Q |
|---|---|---|---|---|---|---|
| Data | Data | Data | Data | Blank | Row Parity | Diagonal Parity |
| Data | Data | Data | Blank | Data | Row Parity | Diagonal Parity |
| Data | Data | Blank | Data | Data | Row Parity | Diagonal Parity |
| Data | Blank | Data | Data | Data | Row Parity | Diagonal Parity | k = 5 (prime)

Fig. 11

| Data Disk 1 | Data Disk 2 | Data Disk 3 | Data Disk 4 | Data Disk 5 | Row Parity Disk | Diagonal Parity Disk |
|---|---|---|---|---|---|---|
| <1, 5> | <1, 6> | <1, 7> | <1, 8> | --- | ⊕1 | ⊕5 |
| <2, 6> | <2, 7> | <2, 8> | --- | <2, 5> | ⊕2 | ⊕6 |
| <3, 7> | <3, 8> | --- | <3, 5> | <3, 6> | ⊕3 | ⊕7 |
| <4, 8> | --- | <4, 5> | <4, 6> | <4, 7> | ⊕4 | ⊕8 |

|     | S1 | S2 | S3 | S4 | S5 | S6 | S7 |
|-----|----|----|----|----|----|----|----|
|     | Q  | D1 | D  | D  | D  | D  | P  |
|     | P  | Q  | D1 | D  | D  | D  | D  |
|     | D  | P  | Q  | D1 | D  | D  | D  |
|     | D  | D  | P  | Q  | D1 | D  | D  |
|     | D  | D  | D  | P  | Q  | D1 | D  |
|     | D  | D  | D  | D  | P  | Q  | D1 |
|     | D1 | D  | D  | D  | D  | P  | Q  |

Fig. 14

| D0 | D1 | D2 | D3 | D4 | P | Q |
|---|---|---|---|---|---|---|
| <1,5> | <1,6> | <1,7> | <1,8> | <1,9> | ⊕1 | ⊕5 |
| <2,6> | <2,7> | <2,8> | <2,9> | <2,5> | ⊕2 | ⊕6 |
| <3,7> | <3,8> | <3,9> | <3,5> | <3,6> | ⊕3 | ⊕7 |
| <4,8> | <4,9> | <4,5> | <4,6> | <4,7> | ⊕4 | ⊕8 |
|  |  |  |  |  |  | ⊕9 |

Fig. 16

| D0 | D1 | D2 | D3 | D4 | P0 | P1 | Q |
|----|----|----|----|----|----|----|----|
| Data | Data | Data | Data | Data | Row Parity | Row Parity | Diagonal Parity |
| Data | Data | Data | Data | Data | Row Parity | Row Parity | Diagonal Parity |
| Data | Data | Data | Data | Data | Row Parity | Row Parity | Diagonal Parity |
| Data | Data | Data | Data | Data | Row Parity | Row Parity | Diagonal Parity | k-1 (under D0–D3), k = 5 (prime) (under D0–D4)

Fig. 19

| Data Disk 1 | Data Disk 2 | Data Disk 3 | Data Disk 4 | Data Disk 5 | Row Parity Disk 0 | Row Parity Disk 1 | Diagonal Parity Disk |
|---|---|---|---|---|---|---|---|
| <1.0, 5> | <1.0, 6> | <1.1, 7> | <1.1, 8> | <1.1, 9> | ⊕1.0 | ⊕1.1 | ⊕5 |
| <2.0, 6> | <2.0, 7> | <2.1, 8> | <2.1, 9> | <2.1, 5> | ⊕2.0 | ⊕2.1 | ⊕6 |
| <3.0, 7> | <3.0, 8> | <3.1, 9> | <3.1, 5> | <3.1, 6> | ⊕3.0 | ⊕3.1 | ⊕7 |
| <4.0, 8> | <4.0, 9> | <4.1, 5> | <4.1, 6> | <4.1, 7> | ⊕4.0 | ⊕4.1 | ⊕8 |
| | | | | | | | ⊕9 |

Fig. 20

METHOD AND SYSTEM FOR STORING DATA IN RAID MEMORY DEVICES

FIELD AND BACKGROUND OF THE INVENTION

The present invention, in some embodiments thereof, relates to a method and apparatus for secure data storage in RAID memory devices and, more particularly, but not exclusively, to such a method and apparatus which conforms to the requirements of the RAID 6 specification for data recovery following two disk failures.

Raid is an acronym for Redundant Array of Independent Disks, and is a system for storing data on multiple disks in which redundancy of data storage between the disks ensures recovery of the data in the event of failure. This is achieved by combining multiple disk drive components into a logical unit, where data is distributed across the drives in one of several ways called RAID levels.

RAID is now used as an umbrella term for computer data storage schemes that can divide and replicate data among multiple physical disk drives. The terms disks and drives will be used interchangeably henceforth. The physical disks are said to be in a RAID array, which is accessed by the operating system as one single disk. The different schemes or architectures are named by the word RAID followed by a number (e.g., RAID 0, RAID 1). Each scheme provides a different balance between two key goals: increasing data reliability and increasing input/output performance.

The most basic form of RAID—a building block for the other levels but not used for data protection, is Raid 0, which has high performance but no redundancy. The data is spread evenly between N disks. RAID 0 gives maximum performance since data retrieval is carried out on all N disks in parallel. However each data item is stored exactly once so disk failure always loses some data.

RAID 1 requires mirroring of all the data. Capacity drops by 50% since all data is stored twice, but excellent performance is still achieved since the data is still spread between disks in the same way, allowing for parallel reads. RAID 1 can support failure of one of each pair of disks, however the price is the loss of half of the capacity. Although multiple disk failures can be tolerated, only one failure is possible per mirrored pair without loss of data.

In greater detail, RAID1 is mirroring. Mirroring comprises writing each block of data to two disks, $D_0$ and $D_1$, and reconstructing a disk by copying its mirror disk upon failure. This method requires performing two disk writes per user write, and consumes an overhead of 100% in capacity. Its rebuild requires performing reads and writes in proportion to the size of the failed disk, without additional computation penalties. Additionally, reading data which resided on the failed disk while in degraded mode requires a single disk read, just as under a normal system operation.

In general, RAID-1 protects from single disk failure. It may protect from more than one failure if no two failed disks are part of the same pair, known as a "RAID group". RAID-1 may also be implemented in "n-way mirroring" mode to protect against any n−1 disk failures. An example is RAID 1.3 which introduced three way mirroring, so that any two disks could fail and all the data could still be recovered. The cost however is that there is only 33% utilization of the disks.

A requirement thus became apparent, to somehow develop a system that allowed for the system to recover all data after the failure of any disk at the cost of a more reasonable overhead, and as a result RAID 4 was developed.

RAID 4 uses a parity bit to allow data recovery following failure of a bit. In RAID 4 data is written over a series of N disks and then a parity bit is set on the N+1 disk. Thus if N is 9, then data is written to 9 disks, and on the tenth, a parity of the nine bits is written. If one disk fails the parity allows for recovery of the lost bit. The failure problem is solved without any major loss of capacity. The utilization rate is 90%. However the tenth disk has to be changed with every change of every single bit on any of the nine disks, thus causing a system bottleneck.

In greater detail, a RAID-4 group contains k data disks and a single parity disk. Each block i in the parity disk P contains the XOR of the blocks at location i in each of the data disks. Reconstructing a failed disk is done by computing the parity of the remaining k disks. The capacity overhead is 1/k. This method contains two types of user writes—full stripe writes known as "encode" and partial stripe modifications known as "update". When encoding a full stripe, an additional disk write must be performed for every k user writes, and k−1 XORs must be performed to calculate the parity. When modifying a single block in the stripe, two disk reads and two disk writes must be performed, as well as two XORs to compute the new parity value. The rebuild of a failed block requires reading k blocks, performing k−1 XORs, and writing the computed value. Reading data which resided on the failed disk while in degraded mode also requires k disk reads and k−1 XOR computations. RAID-4, like RAID-1, protects from a single disk failure.

RAID 5 solves the bottleneck problem of RAID 4 in that parity stripes are spread over all the disks. Thus, although some parity bit somewhere has to be changed with every single change in the data, the changes are spread over all the disks and no bottleneck develops.

However RAID 5 still only allows for a single disk failure.

In order to combine the multiple disk failure of RAID 1.3 with the high utilization rates of RAID 4 and 5, and in addition to avoid system bottlenecks, Raid 6 was specified to use an N+2 parity scheme that allows failure of two disks. RAID 6 defines block-level striping with double distributed parity and provides fault tolerance of two drive failures, so that the array continues to operate with up to two failed drives, irrespective of which two drives fail. Larger RAID disk groups become more practical, especially for high-availability systems. This becomes increasingly important as large-capacity drives lengthen the time needed to recover from the failure of a single drive. Following loss of a drive, single-parity RAID levels are as vulnerable to data loss as a RAID 0 array until the failed drive is replaced and its data rebuilt, but of course the larger the drive, the longer the rebuild takes, causing a large vulnerability interval. The double parity provided by RAID 6 gives time to rebuild the array without the data being at risk if a single additional drive fails before the rebuild is complete.

Reference is now made to FIG. 1, which illustrates a general scheme for RAID-6. RAID-6 is similar to RAID-4 and RAID-5, and can be seen as an extension of these schemes. The main difference is that RAID-6 schemes can tolerate up to two disk failures. The implementation of RAID-6 is not well defined, and several coding schemes are known. RAID-6 is herein defined as any N+2 coding scheme which tolerates double disk failure, while user data is kept in the clear. This additional requirement assures that user reads are not affected by the RAID scheme under normal system operation. The different possible coding schemes vary in performance with respect to various parameters and typical parameters are shown in Table 1.

TABLE 1

Raid 6 Parameters Prior Art.

| Parameter | Optimal Value |
|---|---|
| Capacity Overhead | 2/k |
| Update Overhead | 2 Writes |
|  | 3 Reads |
|  | 3 XORs |
| Rebuild Overhead (1$^{st}$ disk failure) | k/2 Reads |
|  | k − 1 XORs |
| Rebuild Overhead (2$^{nd}$ disk failure) | k/2 Reads |
|  | k − 1 XORs |
| Failed Disks Supported | 2 |

With reference to Table 1, we now describe the main parameters used to measure such a RAID scheme, alongside their optimal values. The first parameter is capacity overhead. The optimal scheme includes two redundancy disks (which may or may not be parity based) for every k data disks, thus reaching a capacity overhead of 2/k. It should be noted, that based on statistical considerations of double disk failure, under a RAID-6 scheme k can easily be set to be twice as large as under RAID-5, thus keeping the same capacity overhead ratio.

When updating a certain block in a stripe, we are interested in the number of IOs required and the number of calculations that must be performed. The optimal is three reads, three writes and three XORs.

RAID-6 rebuild includes two different processes—rebuilding after one disk failure, and rebuilding after two disk failures. After a single disk failure, the optimal number of reads needed is k/2, as opposed to k reads in RAID-4. Such optimal performance requires codes which permit reading partial columns, by taking advantage of both redundancy blocks of the stripe, as described in greater detail hereinbelow. The minimal number of XORs required is k−1. After the second disk failure, rebuilding a failed block, on average, requires reading k/2 blocks, performing k−1 XORs, and writing the computed value. It should be noted that this does not imply that rebuilding a specific block can be done efficiently, since the rebuilding of one block may depend upon the rebuilding of a different block.

In order to prevent bottlenecks, RAID-6 may also be implemented in the manner of RAID-5, where redundancy information is spread on the various disks in a well-balanced manner.

The specification for RAID 6 does not specify how the data recovery is to be achieved and each storage manufacturer embodies RAID 6 in a different way.

Several RAID-6 schemes have been proposed and used in practice. One solution is to use the Reed Solomon error correction code, which is expensive to calculate.

Another possibility is with parity bits. N Data disks are supported by two redundancy disks p1 and p2, each one holding a different parity bit. Again, if all the parity bits are on the same two disks then the bottleneck becomes a problem. However the problem can be solved by use of distributed parity stripes over N+2 disks as was specified in RAID 5.

The following describes two such coding schemes which are based on parity calculations of rows and diagonals in a matrix of blocks. These two codes are known as Even/Odd and RDP. They both add a second parity disk, labeled Q, which contains blocks that hold the parity of diagonals of the data blocks. P, as before, contains blocks that hold the parities of rows of blocks. Note that in both schemes, it is advantageous to work with a block size which is smaller than the native page size, for the examples in this section we assume the native page size is 4 KB, and that the block size is 1 KB. Each stripe contains four rows, and thus the four blocks present on each disk form a single native page. It is assumed that pages are read and written using a single disk operation.

Even Odd

Reference is now made to FIG. 2, which illustrates a version of RAID 6 called "even odd", which again uses two parity disks P and Q. A P disk is set up exactly as in RAID 4 and 5, to give a row parity, and Q is the parity of the diagonals. The system requires a prime number of diagonals k, and one less number of rows (k−1). The geometry of the situation gives one more diagonal than there are rows and so the Even Odd scheme adds the extra diagonal's parity to each of the other diagonal parity blocks. The resulting scheme works but the update overhead is sub-optimal.

Under Even/Odd, each stripe contains k (k must be prime) data disks, and two parity disks P and Q. The stripe is composed of a matrix of blocks, which contains k−1 rows. Each of the k+2 disks is viewed as a column in the matrix. Disk P contains k−1 blocks, each consisting of the parity of the k data disk blocks in its row. The k by k−1 matrix made up by the blocks in the data disks contains k diagonals, each of size k−1. The k−1 first diagonals are considered "regular" diagonals, and the last diagonal is known as the "extra" diagonal. Each of the k−1 blocks in disk Q, holds the parity of one of the regular diagonals XORed with the parity of the extra diagonal.

It is not coincidental that there exist more diagonals than rows. It is this asymmetry that allows the recovery of two disk (column) failures. The asymmetry provides that for any two disks that fail, each of their respective columns contains at least one block which belongs to a diagonal not present in the second column. This allows the beginning of the recovery process, by reconstructing this block according to its diagonal information alone. The recovery process continues by reconstructing the block in the same row as the recovered block, using their row information. Performing these two steps iteratively yields a complete recovery. Of course, this entire process can begin only after the parity blocks of the diagonals are decoded. To achieve this the parity of the extra diagonal is decoded by XORing all blocks in the stripe, and then XORing this value with the rest of the diagonals' parity blocks.

Let us now analyze the efficiency of Even/Odd. It is optimal in terms of capacity overhead, and also in terms of the I/O overhead imposed upon update operations. In terms of computation, however, it is not optimal. The average number of XORs needed when performing an update operation, is almost 4. The reason for this is that updating the blocks of the "extra" diagonal requires many more XORs than updating the blocks of the "regular" diagonals. An updated block in a regular diagonal requires (the optimal) 3 XORs. An updated block in the extra diagonal requires k+1 XORs. Since there are k−1 blocks in the extra diagonal, and $(k-1)^2$ blocks in regular diagonals, the average number of XORs is $3(k-1)^2+(k-1)(k+1)$ divided by k(k−1) total blocks. This equals (4k−2)/k which approaches 4 as k grows. That is to say, a particularly high update overhead is encountered when updating the $k^{th}$ diagonal (the one that has no corresponding row) since it is spread over all the other diagonal parities. The overhead can be reduced by using data blocks of 1K, and then updating a whole column in one go. In this case just three reads and three writes are required. However four XOR operations are still required per update.

Rebuild efficiency for first disk failure requires k reads and the optimal k−1 XORs. This operation is performed using row parity only, just as in RAID-4. Rebuild efficiency for two disk failure requires more XORs than optimal, due to extra XORs performed to decode the extra diagonal's parity information.

RDP Row Diagonal Parity

Reference is now made to FIG. 3, which is a simplified schematic diagram illustrating an alternative scheme to Even Odd known as RDP or Row Diagonal Parity. RDP is the same as Even Odd except that it deals with the extra parity data (the additional diagonal in the Even Odd scheme) in a different way. RDP arranges the data in a prime minus one number of rows and data columns K (where K+1 is prime). The row parity data P is then included in calculation of the diagonal parities. The data matrix is then one place short for the K diagonals, so that the $K^{th}$ diagonal is not written. However since the row parities are themselves included in calculating the remaining diagonal parities, the necessary information is present and full two-disk failure data recovery is possible.

In greater detail, RDP is very similar to Even/Odd. The main difference is in the handling of the extra diagonal. Instead of adding its parity to all of the blocks in Q, RDP simply does not keep parity information for the extra diagonal. This of course is not enough, since now the blocks in the extra diagonal are "represented" only in one parity block. To remedy this, RDP adds the blocks of the first parity column (P) to the diagonals. In this way, if a block in the extra diagonal is updated, it induces a change in two parity blocks. The first is its row parity block in P, and the second is its row parity block's diagonal parity block in Q.

Under RDP, each stripe contains k (k+1 must be prime) data disks, and two parity disks P and Q. The stripe is composed of a matrix of blocks, which contains k rows. Each of the k+2 disks is viewed as a column in the matrix. Disk P contains k blocks, each consisting of the parity of the k data disk blocks in its row. The k by k+1 matrix made up by the blocks in the data disks and P contains k regular diagonals and one extra diagonal, each of size k. Each of the k blocks in disk Q, holds the parity of one of the regular diagonals.

The efficiency of RDP is similar to Even/Odd. Again, the average number of XORs needed when performing an update operation is almost 4 (in contrast to an optimal of 3), and the number of reads needed when reconstructing a block after a single disk failure is k (where the optimal is k/2). The reason for the extra XORs is that when updating a block, its row parity block in P must be updated as well as two diagonal parity blocks in Q—the block of its own diagonal and the block of its parity block's diagonal. In general, $(k-1)^2$ blocks require 4 XORs, and the remaining 2k−1 blocks require 3 XORs. Thus the average over all $k^2$ blocks is 3 plus $(k-1)^2/k^2$ which approaches 4 as k grows.

The extra XORs mandate that each column is mapped to a page instead of each block being mapped to a page. If each block was mapped to a page these extra XORs would cause additional read and write operations for each update, which is not acceptable. Thus, only optimal codes (in terms of update efficiency) have the ability to map blocks to pages without incurring an IO overhead.

The importance of mapping blocks to pages relates to efficient rebuild. In theory, RDP has a rebuild technique for first disk failure, which requires reading only approximately three quarters of the blocks. This can be done by checking half of the rows using the P parity, and then recovering the remaining rows using the diagonals. However, it offers little benefit in practice because these blocks reside in all of the columns, and each column is mapped to a page. Thus, in practice, no read is spared and k reads must be performed.

General to Even Odd and RDP

It is noted that while k, which dictates the number of columns in both codes, must be a prime number (or a prime number minus one), this does not diminish the flexibility of choosing any number of disks for the stripe size. This can be accomplished by using virtual disks for the remaining columns, whose content is permanently set to zero and thus does not affect any XOR calculations. In fact, the content may be permanently set to any predefined data which does not affect the XOR calculations. k must only be larger than the maximum number of disks in a stripe. There is a slight penalty for fixing a large k with these codes, because their update efficiency decreases as k grows.

SUMMARY OF THE INVENTION

The present embodiments seek to reduce the overheads while retaining the utilization advantages of the RAID 6 schemes mentioned above. The schemes may be unconstrained with regard to stripe sizes and allow for addition of new disks once the system configuration has been selected.

According to an aspect of some embodiments of the present invention there is provided a redundant array of independent disk (RAID) memory storage system comprising data storage blocks arranged in the array in a first plurality of data rows and a second plurality of data columns, wherein parity data is stored in additionally defined parity blocks, and wherein numbers of blocks in respective columns are different.

In an embodiment, at least some of the parity data is row parity data placed in row parity blocks in a row parity column. At least some of the parity data is typically diagonal parity data placed in diagonal parity blocks in a diagonal parity column.

In an embodiment, at least some of the parity data is diagonal parity data placed in a column of diagonal parity data, the diagonal parity column comprising one more block than a number of the first plurality of data rows.

In an embodiment, at least some of the parity data is row parity data placed in row parity blocks in a row parity column wherein at least some of the parity data is diagonal parity data placed in diagonal parity blocks in a diagonal parity column, wherein the data storage blocks are arranged with a blank diagonal, such that each data column sharing the blank diagonal has one less block than a number of the plurality of rows and the diagonal parity column has a number of blocks equal to the number of the first plurality of data rows.

The array may comprise solid state drives (SSD).

In an embodiment, the second plurality of data columns equals a prime number and the first plurality of data rows is one less than the second plurality of data columns.

In an embodiment, the second plurality of data columns is equal to a number of disks allowed in the array, wherein at any given time an actual number of disks present is less than or equal to the allowed number of disks.

An embodiment may comprise a disk addition unit for adding a new disk to the array and maintaining a balance of parity blocks over the array, the disk addition unit being configured to migrate a selected row parity block to the new disk by retaining the row parity block at an original disk position and defining a zeroed block of data to receive future parity updates for the selected row parity block, the disk addition unit further configured to calculate a new diagonal parity block on the new disk.

An embodiment may comprise a single disk failure recovery unit to use row parity to recover a first plurality of lost data blocks and to use diagonal parity to recover remaining data blocks, thereby to use data blocks already read from the row parity recovery to calculate the diagonal parity recovery.

An alternative embodiment may comprise a double disk failure recovery unit, to recover a first block of a first lost disk in a first, and then succeeding ones, of the rows using diagonal parity and then to recover a first block of a second lost disk in the first row, and then succeeding rows using row parity data of the first row and then succeeding rows respectively.

An embodiment may comprise a data update unit for writing a new data block over an old data block, the data update unit configured to read the old data block, and existing parity data, write the new data block and XOR data of the old data block with data of the new data block and the existing parity data to form new parity data.

According to a second aspect of the present invention there is provided a redundant array of independent disk (RAID) memory storage method comprising storing data storage blocks arranged in a first plurality of data rows and a second plurality of data columns, and storing parity data in additionally defined parity blocks, the columns being arranged such that numbers of blocks in respective columns are different.

In an embodiment, at least some of the parity data is row parity data placed in row parity blocks in a row parity column wherein at least some of the parity data is diagonal parity data placed in diagonal parity blocks in a diagonal parity column, and the method involves arranging the data storage blocks with a blank diagonal, such that each data column sharing the blank diagonal has one less block than a number of the plurality of rows and the diagonal parity column has a number of blocks equal to the number of the first plurality of data rows.

In an embodiment, the second plurality of data columns equals a prime number and the first plurality of data rows is one less than the second plurality of data columns.

In an embodiment, the second plurality of data columns is equal to a number of disks allowed in the array, and providing, at any given time, an actual number of disks which is less than or equal to the allowed number of disks.

An embodiment may comprise adding a new disk to the array and maintaining a balance of parity blocks over the array, the method comprising migrating a selected row parity block to the new disk by retaining the row parity block at an original disk position and defining a zeroed block of data to receive future parity updates for the selected row parity block, and calculating a new diagonal parity block on the new disk.

In the event of single disk failure, the method may use row parity to recover a first plurality of lost data blocks and to use diagonal parity to recover remaining data blocks, thereby to use data blocks already read from the row parity recover to calculate the diagonal parity recovery.

In the event of double disk failure, the method may recover a first block of a first lost disk in a first, and then succeeding ones, of the rows using diagonal parity and then to recover a first block of a second lost disk in the first row, and then succeeding rows using row parity data of the first row and then succeeding rows respectively.

Writing a new data block over an old data block, may involve reading the old data block and existing parity data, writing the new data block and XORing data of the old data block with data of the new data block and the existing parity data to form new parity data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a simplified block diagram schematically illustrating the known specification for RAID 6;

FIG. 2 is a schematic diagram illustrating the known Even Odd implementation of RAID 6;

FIG. 3 is a simplified diagram illustrating the known RDP implementation of RAID 6;

FIG. 6 is a schematic block diagram showing in greater detail the distribution of data blocks of FIG. 5;

FIG. 10 is a simplified schematic diagram illustrating an alternative way in which the p and q parity blocks can be distributed in balanced manner between actual physical disks according to embodiments of the present invention;

FIG. 11 is a simplified schematic block diagram illustrating an embodiment in which a diagonal over the data is kept blank;

FIG. 12 is a simplified block diagram illustrating the embodiment of FIG. 11 in which the data blocks of FIG. 11 are shown in greater detail;

FIG. 13 is a simplified schematic diagram illustrating one way in which the blocks can be distributed in balanced manner between actual physical disks according to embodiments of the present invention;

FIG. 14 is a simplified schematic diagram illustrating an alternative way in which the blocks can be distributed in balanced manner between actual physical disks according to embodiments of the present invention;

FIG. 16 is a simplified schematic diagram illustrating recovery of data after a single disk failure by using row parity for the first half of the data and diagonal parity for the second half of the data, thus saving on the number of data blocks that need to be read to recover the data, according to embodiments of the present invention;

FIG. 19 is a simplified schematic block diagram illustrating an embodiment in which several row parity columns are present;

FIG. 20 is a simplified block diagram illustrating the embodiment of FIG. 19 in which the data blocks of FIG. 19 are shown in greater detail;

DESCRIPTION OF SPECIFIC EMBODIMENTS OF THE INVENTION

Figure 4:
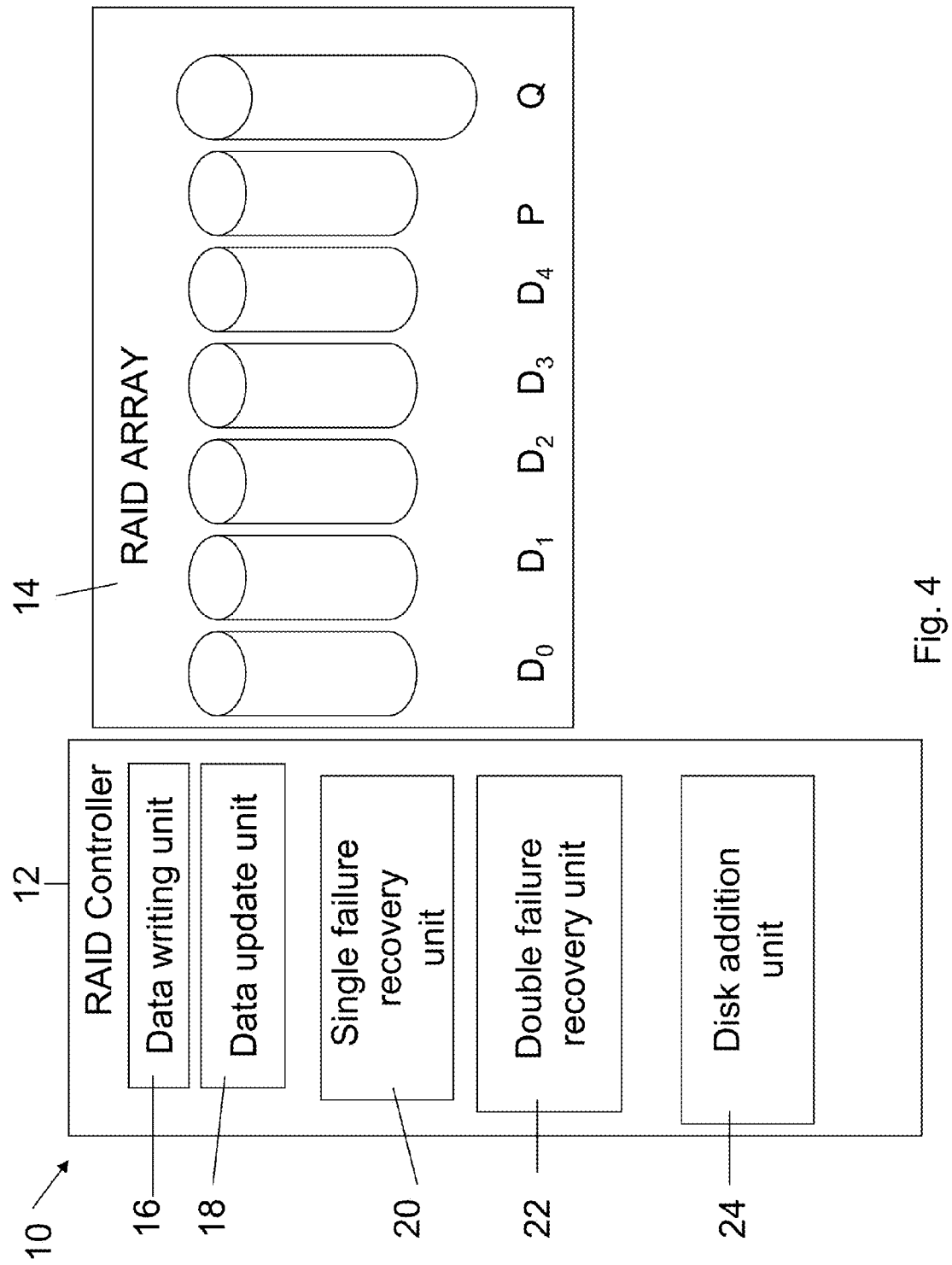
FIG. 4 is a simplified schematic diagram illustrating a RAID 6 memory system according to a first embodiment of the present invention.

The present invention, in some embodiments thereof, relates to a system for secure data storage, in particular for RAID 6.

For purposes of better understanding some embodiments of the present invention, as illustrated in FIGS. 4-20 of the drawings, reference has previously been made to the construction and operation of a RAID 6 memory system as illustrated in FIGS. 1-3.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 4, which illustrates a redundant array of independent disk (RAID) memory storage system 10 according to a first embodiment of the present invention. The memory storage system 10 comprises a controller 12 and an array 14 of data storage disks, in this example five data disks $D_0 \ldots D_4$.

The controller 12 includes a data write unit 16 for writing initial data into the array, an update unit 18 for updating existing data in the array, a single failure recovery unit 20 for recovering data after a single disk failure and a double failure recovery unit 22 for recovering data following concurrent failure of two disks. A disk addition unit 24 manages the addition of a new disk to the system, either after failure of an existing disk or when it is desired to expand the system 10. The operation of each of these units is discussed in greater detail herein below.

Each of the disks in the array 14 stores a column of data blocks. The same data block in successive disks forms a row, which is to say the rows cross the disks. The data storage blocks are stored alongside parity data blocks in parity disks p and q, and the numbers of data blocks in the different columns or disks are different.

Row parity data is placed in row parity blocks in row parity column p. Diagonal parity data is placed in diagonal parity blocks in a diagonal parity column q.

In the case of five data columns and four data rows, the number of diagonals is one greater than the number of rows. Hence the diagonal parity column Q comprises one more block than the other columns. More generally, as will be discussed below, the number of data columns is a prime number, and the number of rows is one less than that prime number, creating the asymmetry discussed hereinabove.

In practice the various columns are distributed over the physical disks available, so as not to cause system bottlenecks.

In an alternative to the above and as discussed below in respect of FIGS. 11 and 12, an array is set up again with a prime number of columns and one less than that prime number of rows, and one or more diagonals across the data disks are left blank. Hence, in the example where one diagonal is left blank, the row and diagonal parity disks, p and q, as well as one of the data disks have one more block than the other data disks.

In another alternative to the above and as discussed below in respect of FIGS. 19 and 20, an array is set up again in which more than one row parity column is present. This configuration may result in higher capacity overhead which allows for faster rebuild of a single disk failure.

The array may comprise a plurality of solid state drives (SSD) as opposed to magnetic disks. SSDs are random access, whereas magnetic disks are mechanical devices with momentum. The magnetic disks are thus most efficient where data readout is largely serial and having uneven sizes of columns between stripes causes the magnetic disks to work inefficiently. SSDs however are solid state with no momentum issues and thus the present embodiments are ideally suited to an array of SSD devices, or any other random access device.

As mentioned above, the number of data columns may equal a prime number and the number of data rows is one less than the number of data columns, to create an asymmetry that ensures that each column is absent from one of the diagonals.

In an embodiment, the number of data columns is equal to a number of disks allowed in the array—which is the prime number referred to above. At any given time an actual number of disks present is less than or equal to the allowed number of disks, so that new disks can be added until that allowed number is reached. When a disk is added, data parity blocks need to be added to the new disk to keep the parity blocks, the p and q columns, evenly spread over the physical disks to avoid system bottlenecks. Hence the controller 12 comprises a disk addition unit 24 to manage the process of adding a disk to the array. In order to add a new disk to the array and maintain a balance of parity blocks over the array, the disk addition unit 24 migrates a row parity block to the new disk. However, in an embodiment, instead of actually writing data on the new disk, the unit in fact retains the row parity blocks at their original disk position and defines a zeroed block of data in the new disk to receive future parity updates for the selected row parity block. Because the original parity block is retained, zero is the current correct parity for the row, so that only updates from now onwards are needed and a resource consuming read and write is avoided. The disk addition unit copies a single diagonal parity block to the new disk since the addition of a new disk means there is a single old diagonal parity block that does not reside in the new diagonal parity group. The rest of the diagonal parity blocks are defined as zeroed blocks of data in an identical manner to the case described above for row parity blocks, because they can be placed in positions such that they are in the same parity groups as the old diagonal parity blocks.

The controller 12 comprises a single-disk-failure recovery unit 20. A basic embodiment recovers the data of the entire disk using row parity only or diagonal parity only. However a more efficient embodiment uses row parity to recover just some, typically half, of the lost data blocks and then switches to diagonal parity to recover the remaining data blocks. The switch to diagonal parity means that data blocks already read to recover row parity data can be reused and thus the entire disk can be recovered with considerably fewer read operations.

A double-disk-failure recovery unit 22 is used to recover data following failure of two of the disks and is discussed in greater detail below in respect of FIG. 18. Briefly the unit selects a first block for recovery from one of the disks, where the block's diagonal parity includes that block but does not include any blocks from the other missing column. The unit recovers this first block using the diagonal parity. The unit then recovers the block of the same row in the second missing disk using the row parity. The unit continues to alternate between diagonal and row parity until all the rows are recovered.

The data update unit 18 writes a new data block over an old data block. The process is described in greater detail in respect of FIG. 8 hereinbelow. The data update unit reads the old data block, and existing parity data, then writes the new data block and XORs data of the old data block with data of the new data block and the existing parity data to form new parity data. There is no need to read the other data blocks in the same row or column since they remain unchanged, meaning their parity remains unchanged.

Now considered in greater detail, the present embodiments reduce system overheads at the expense of capacity. A block is added to contain the parity of the $k^{th}$ diagonal. This leads to the disadvantage of having columns which are different sizes, and thus disks which are different sizes. In fact the different sized disk problem can be avoided if the blocks are spread over different disks in such a way as to provide no noticeable difference. Spreading over different disks has the added advantage of preventing bottleneck creation, as discussed with the existing schemes.

As discussed above, a RAID 6 scheme based on magnetic disks requires sequential disk actions and the absence of an even disk layout means that the tendency of disk actions to be sequential is lost. However when working with SSDs (Solid State Drives) which are much more random access, data access can be in any desired sequence without any issue of mechanical inertia.

An SSD is a data storage device that uses solid-state memory to store persistent data with the intention of providing access in the same manner of a traditional block i/o hard disk drive. SSDs are distinguished from traditional hard disk drives (HDDs), which are electromechanical devices containing spinning disks and movable read/write heads. In contrast, SSDs use microchips which retain data in non-volatile memory chips and contain no moving parts. Compared to electromechanical HDDs, SSDs are typically less susceptible to physical shock, are silent, have lower access time and latency, but are many times more expensive per gigabyte (GB). SSDs use the same interface as hard disk drives, thus easily replacing them in most applications.

At present, SSDs use NAND-based flash memory, which retains memory even without power. SSDs using volatile random-access memory (RAM) also exist for situations which require even faster access, but do not necessarily need data persistence after power loss, or use external power or batteries to maintain the data after power is removed The scheme presently being outlined also requires more space for redundancy than the previously outlined RAID6 schemes. However as K gets larger, the additional overhead gets smaller so that this particular disadvantage is manageable. In particular K must be at least as large as the number of disks, but it can be larger as well, and even considerably larger, in order to reduce the overhead.

Decoding in the event of failure is relatively simple. For a two-disk failure, as shown in FIG. 18, a procedure zigzags between rows and diagonals, as will be explained in greater detail hereinbelow. For a single disk failure, FIGS. 16 and 17, the number of reads can be reduced by using diagonal parity based on rows that have already been read wherever possible, something that the Even Odd and RDP systems does not allow without increasing IO overhead for update operations.

An alternative embodiment, discussed below with respect to FIGS. 11 and 12, uses an empty diagonal in place of an extra block on the Q disk. In practice there is no memory that must be left empty, rather the empty space can be a geometric construct used to map the data onto actual disks, with different sizes of disks or columns. As with the first embodiment this cannot be done onto magnetic disks without seriously affecting the performance. Other alternative embodiments may use any number of such empty diagonals.

Another alternative embodiment, discussed below with respect to FIGS. 19 and 20, uses multiple row parity columns to reduce the rebuild time of a single disk failure at the expense of additional capacity overhead.

A common point between the embodiments is the use of different size columns for the storage scheme. Additionally, the number of parity blocks in these embodiments is equal to the number of parity sets, such that each data block is present in exactly two parity blocks.

SSD, as discussed, is a random access media storage and is suitable for distributed mapping of data. That is to say there is no constraint caused by mechanical momentum that data should be consecutive. Disks with distributed mapping can have either static mapping or dynamic mapping and the mapping may include a table of metadata to say where the extra Q blocks reside. Whatever the mapping, access has to be random, since the extra Q blocks are distributed independently of the location of the data for which they are the parity.

Now the P and Q may be spread over different disks, allowing the system to take away or add disks. Disks are generally taken away following failure and the prior art systems may be unprotected until the missing disk is replaced. The present system allows for disks to be added freely up to a predetermined number, the original K. That is to say the original K represents a number of total disks in the system, which can be any combination of real and virtual disks, giving a system which is readily expandable up to K disks. The system needs to be balanced, and the P and Q data are spread over the various real disks, so that whenever a new real disk is provided, parts of P and Q may be moved to the new disks so that the system remains balanced.

Moving data is an expensive system operation. In an embodiment the actual data that is moved upon disk addition is lowered to virtually zero. The new disk begins with data zero, which is in fact the correct parity for a new bit added to a row that is already parity checked. Hence there is no need to transfer actual data, merely to update the parity whenever something on the row now changes. The same applies with the diagonals provided the parities of the diagonals are written in the right places. Only the extra diagonal parity needs to be added and actually written—since in this case alone the parity is not necessarily zero.

A variation of the scheme could have left and right diagonals as a parity scheme instead of rows and diagonals, or any other two independent parity groups, where the parity blocks are stored in two of the columns. Each data block may be present in two of the parity blocks, in a manner such that the number of parity sets matches the number of parity blocks.

The present embodiments are now considered in greater detail. Embodiments may be simple to understand and implement, as well as efficient and flexible with respect to the parameters outlined in previous sections. Embodiments may be optimal in terms of updating data, mainly because this is the most frequent operation. Additionally, the present embodiments include the possibility of reducing reads when recovering from a single disk failure.

Figure 5:
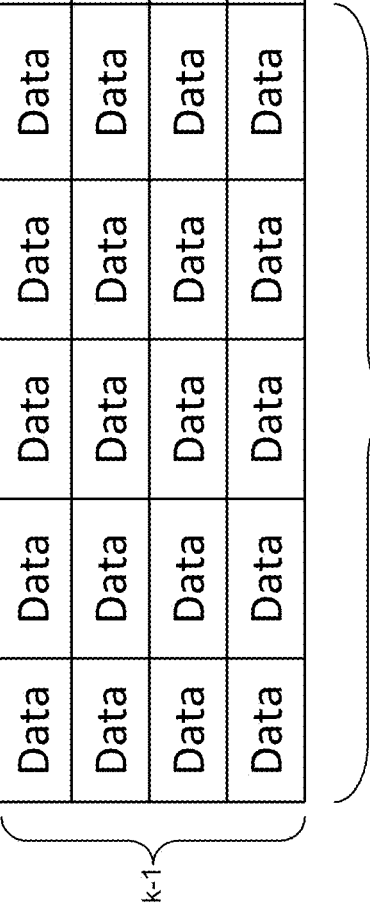
FIG. 5 is a block diagram showing a distribution of data blocks in the RAID 6 memory array of FIG. 4.

Relating now to FIG. 5, which is a simplified schematic diagram of the present embodiment, in the case shown, k is 5, a prime number, and there are five columns, D0-D4. There are four rows (k−1). The P column consists of the same four rows but the Q column has an extra row.

The block size may be defined as 4k. The same scheme is shown in FIG. 6, in which the individual data blocks are identified.

TABLE 2

Parameters of a RAID 6 system of the present embodiments.

| Parameter | Value |
|---|---|
| Capacity Overhead | 2/k + ε |
| Update Overhead | 2 Writes |
|  | 3 Reads |
|  | 3 XORs |
| Rebuild Overhead (1st disk failure) | ~3k/4 Reads |
|  | k − 1 XORs |
| Rebuild Overhead (2nd disk failure) | k/2 Reads |
|  | k − 1 XORs |
| Failed Disks Supported | 2 |

The variable depth RAID scheme of the present embodiments is in many respects simpler than the schemes presented in the previous section. Instead of finding a sophisticated way of dealing with the extra diagonal, it is simply added as an additional block, a specific parity block. It should be noted that each cell in the scheme can be mapped to a native page read and written in a single operation. Each stripe contains k (k must be prime) data columns, and two parity columns P and Q. The stripe is composed of a quasi-matrix of blocks, which contains k−1 rows. Column P contains k−1 blocks, each consisting of the parity of the k data disk blocks in its row. The k by k−1 matrix made up of the blocks in the data columns contains k diagonals, each of size k−1. Column Q, in contrast with the rest of the columns, contains k blocks and not k−1. Each of the k blocks in disk Q holds the parity of one of the diagonals.

It should be noted that the ordering of blocks within each column may be arbitrary. Furthermore, the extra block in column Q may be placed in a data column which does not contain a data block in the diagonal of which this block is the parity. Some of the rows may be blank.

The resulting code is optimal under nearly all operations with respect to IOs and computation, excluding the reads needed to rebuild a disk after one failure. The rebuild overhead after one disk failure can be brought down to a bit more than 3k/4 reads, midway between the optimal of k/2 and the k reads needed by Even/Odd and RDP. The extra block causes the capacity overhead to grow slightly, but this overhead of $1/(k^2-k)$ can be made as small as required by increasing k. Another problem this extra block may pose is that Q is larger than the rest of the columns. This is easily fixed by using a configuration where the parity columns of each stripe are balanced across the various disks. This configuration balances both IOs and capacity utilization between the physical disks.

In cases where it is more favorable to map entire columns to native disk pages, increasing k may bring the extra Q block down to an arbitrarily small size.

Figure 7:
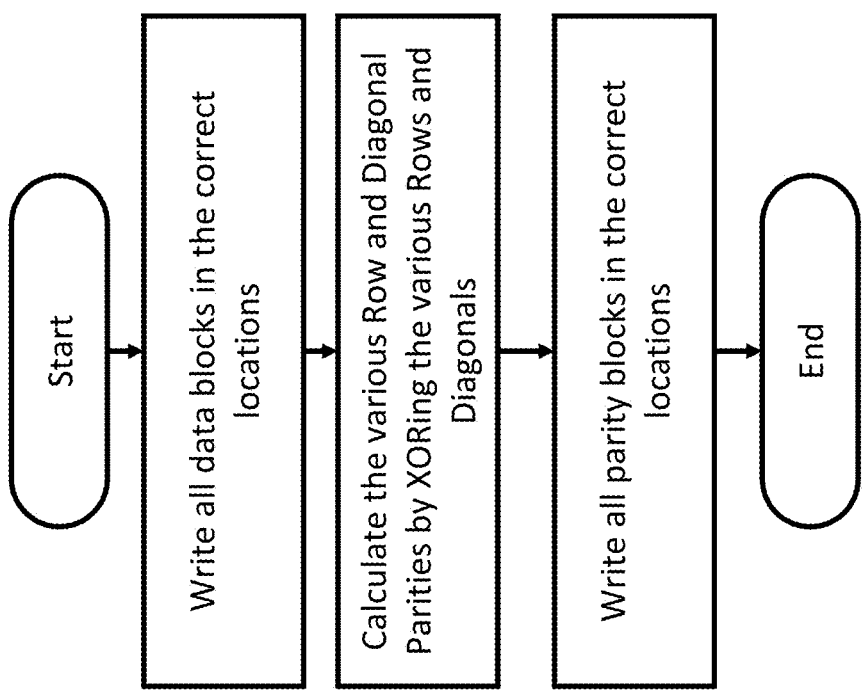
FIG. 7 is a simplified schematic flow chart illustrating a data write operation according to the present embodiments.

FIG. 7 is a simplified flow chart illustrating a procedure for initial encoding of data onto a disk. All data blocks are written in their desired positions. The row and diagonal parities are then calculated by XOR operations over the various rows and diagonals and written in their appropriate positions.

Figure 8:
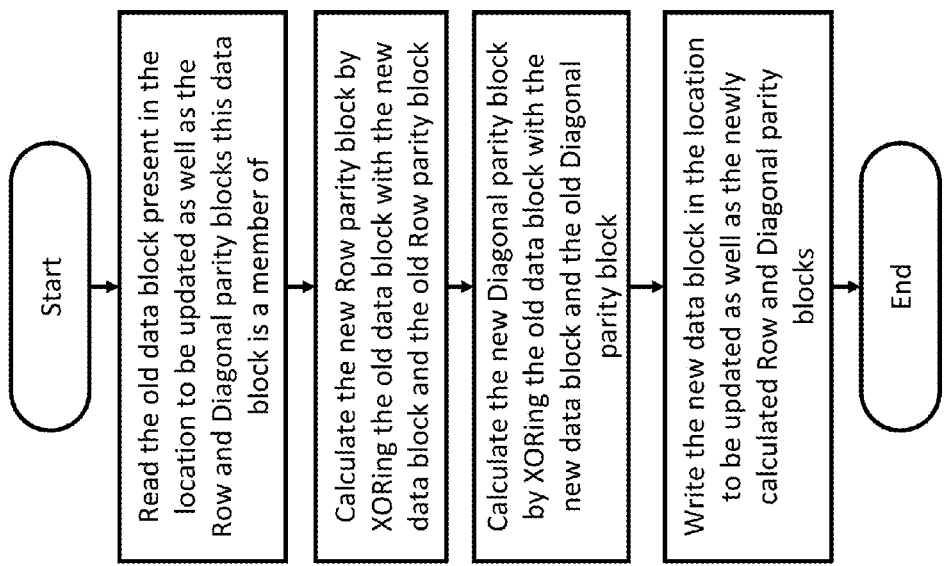
FIG. 8 is a simplified schematic flow chart illustrating a data update operation according to the present embodiments.

Reference is now made to FIG. 8, which is a simplified diagram illustrating the update procedure when data is modified. Updating is carried out with an optimal number of operations. All that is needed is to write the data itself and to add a one, or a zero as appropriate, to each of the parities. The whole involves three reads, three writes and three XORs. FIG. 8 shows an example in which an entire stripe is rewritten, in which case the new parities are calculated for each row and diagonal by XORing the old data with each one of the two (row and diagonal) old parities and the new data.

Figure 9:
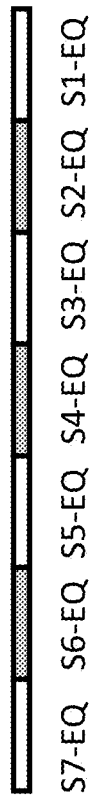
FIG. 9 is a simplified schematic diagram illustrating one way in which the p and q parity blocks can be distributed in balanced manner between actual physical disks according to embodiments of the present invention.

Reference is now made to FIG. 9, which illustrates a distribution of the P and Q data amongst the actual disks of a system. The disks comprise several stripes with distributed P and Q columns and illustrate how the same sized disks can be used, with different sizes for the Q and other stripes. As illustrated, extra-Q (EQ) blocks are provided at the bottom of each disk, thus providing even distribution between the disks and allowing the addition and removal of disks.

FIG. 10 illustrates an alternative configuration in which Q blocks are mapped onto existing disks. Again the P and Q columns are distributed over disks that are the same size.

Reference is now made to FIG. 11, which is a simplified diagram illustrating a second embodiment of the present invention. Again K is set at 5, and there are 5 columns $D_0$-$D_4$. There are four rows in the five disks and four rows in the parity disk. However the Q disk also has four rows, since one of the diagonals is left blank.

As illustrated in FIGS. 11 and 12, an equivalent way of providing the effect is by setting one of the diagonals as a virtual diagonal, whose content is fixed and equals zero. In fact any number of diagonals may be set as virtual. It is merely a matter of efficient mapping between cells in the stripe and physical disk locations to eliminate any further capacity overhead. The only constraint when performing such mappings is that cells in the same column must reside on the same disk, and vice versa.

Figure 13:
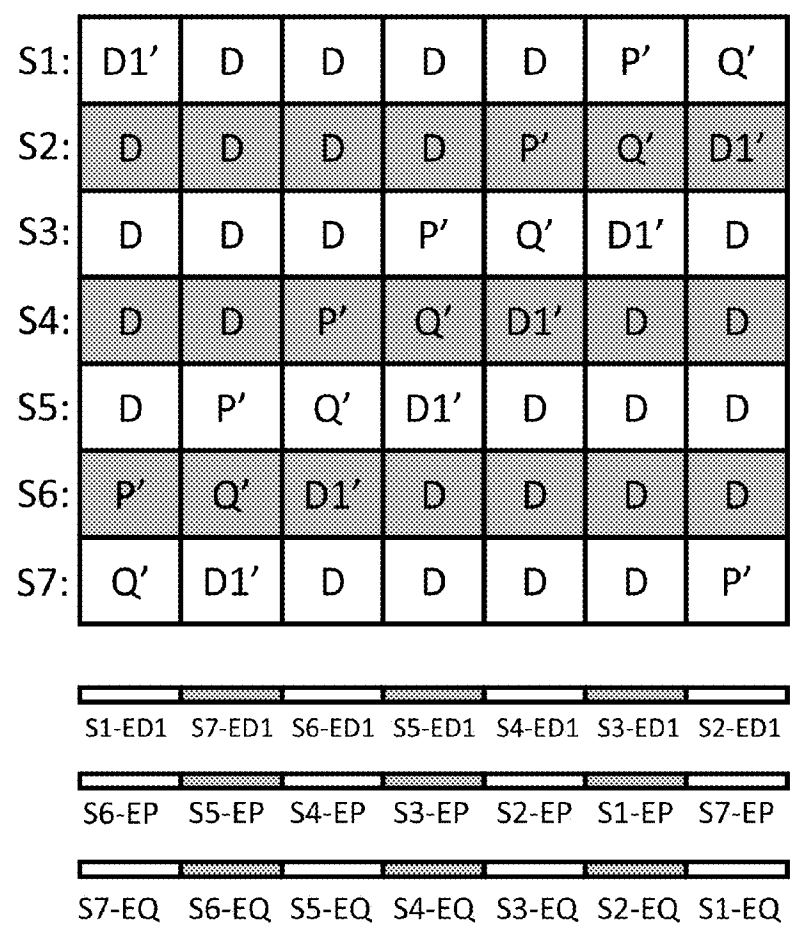
Figure 15:
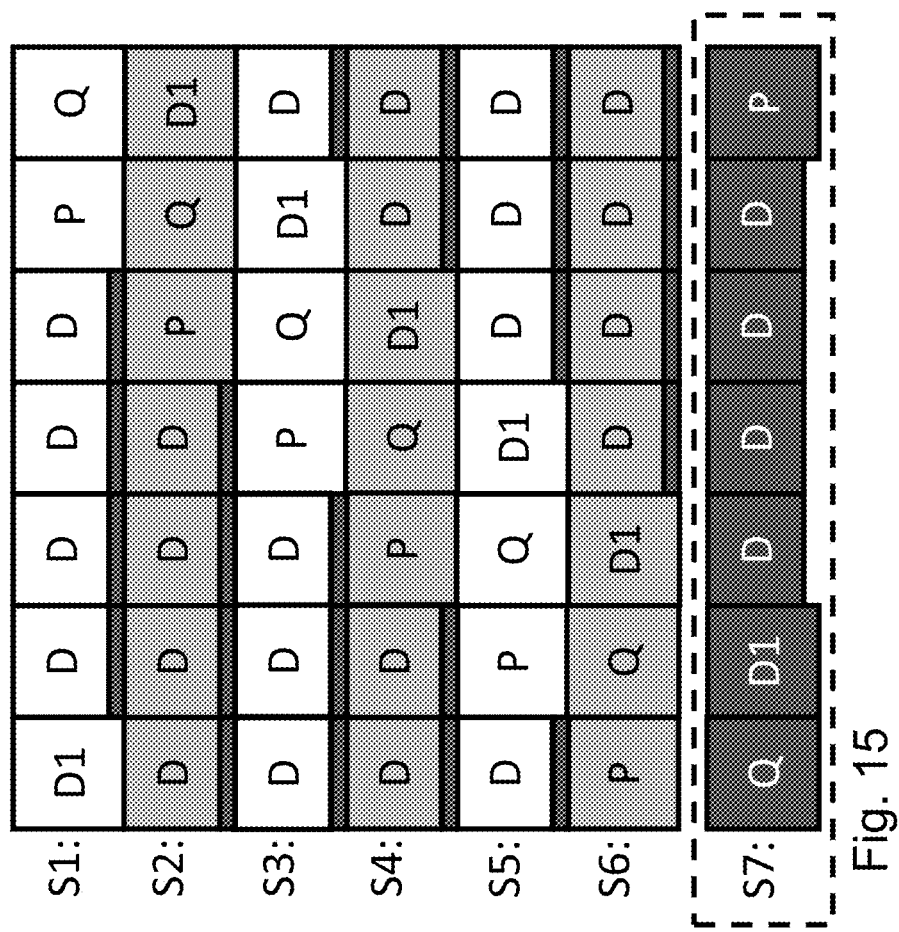
FIG. 15 is a simplified schematic diagram illustrating an another alternative way in which the blocks can be distributed in balanced manner between actual physical disks according to embodiments of the present invention.

FIGS. 13, 14 and 15 illustrate various distributions of the P and Q data amongst the actual disks of a system, in accordance with this second embodiment. The disks comprise several stripes with distributed D1, P and Q columns which are larger than the rest of the D columns and illustrate how the same sized disks can be used.

As illustrated in FIG. 13, extra-D1, extra-P and extra-Q blocks are provided at the bottom of each disk, thus providing an even distribution between the disks and allowing the addition and removal of disks.

FIG. 14 illustrates an alternative configuration in which the extra blocks are mapped onto existing disks. Again the D1, P and Q columns are distributed over disks that are the same size.

FIG. 15 illustrates an alternative configuration in which the first six stripes are mapped according to their first row, leaving cracks between them where smaller D columns are present. The seventh stripe, or any other data, can be mapped into these cracks. The resulting configuration contains equal sized disks without wasting any additional disk space.

FIG. 19, is a simplified diagram illustrating another embodiment of the present invention. Again K is set at 5, and there are 5 columns $D_0$-$D_4$. There are two row parity columns P0 and P1, in addition to a single diagonal parity column Q.

As illustrated in FIGS. 19 and 20, P0 may hold parity data for the rows made up of data blocks in columns D1 and D2, while P1 holds parity data for the rows made up of data blocks in columns D3, D4 and D5. In fact any number of row parity columns may be added. Adding such row parity columns reduces the overhead of a single disk rebuild, which can be performed using row parity information, at the expense of increased capacity overhead.

Rebuild Process

Reference is now made to FIG. 16, which illustrates failure of a single disk, in this case $D_0$. Rebuilding a failed disk after a single disk failure can be done naively using row parity information only. This requires reading k blocks per failed block.

A more efficient method is possible, by utilizing diagonal parity information only, which requires reading k–1 blocks per failed block.

Figure 17:
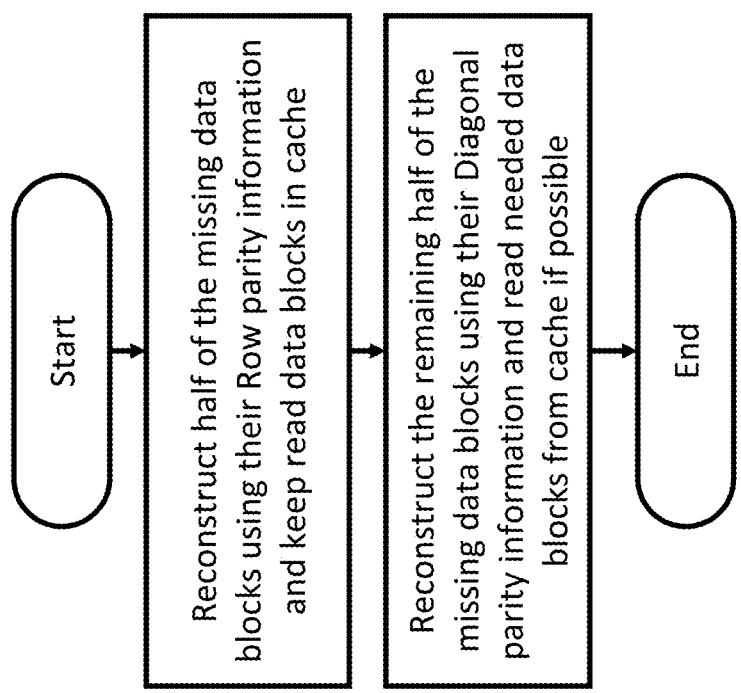
FIG. 17 is a simplified flow chart illustrating the process of recovering data following a single disk failure according to embodiments of the present invention.

An even more efficient method is illustrated in the flow chart of FIG. 17, which is a simplified flow chart of the recovery process following single disk failure. The method includes using both row and diagonal parity. Assuming $D_0$ fails, we can recover the first two blocks, 1 and 2, using their row parity. It is then possible to recover blocks 3 and 4 using their diagonal parity, but in each case the upper two blocks of the diagonal have already been read when recovering the first two blocks from the row parity and do not need to be read again. Four of the read blocks are in fact utilized both in row and diagonal computations, and thus we reduce the number of actual reads needed.

The above method does not provide any advantage when rebuilding lost parity columns, and thus it requires a little more than 3k/4 reads on average, bearing in mind that each disk contains both data and parity columns in a distribution which balances the reads evenly across the surviving disks.

Figure 18:
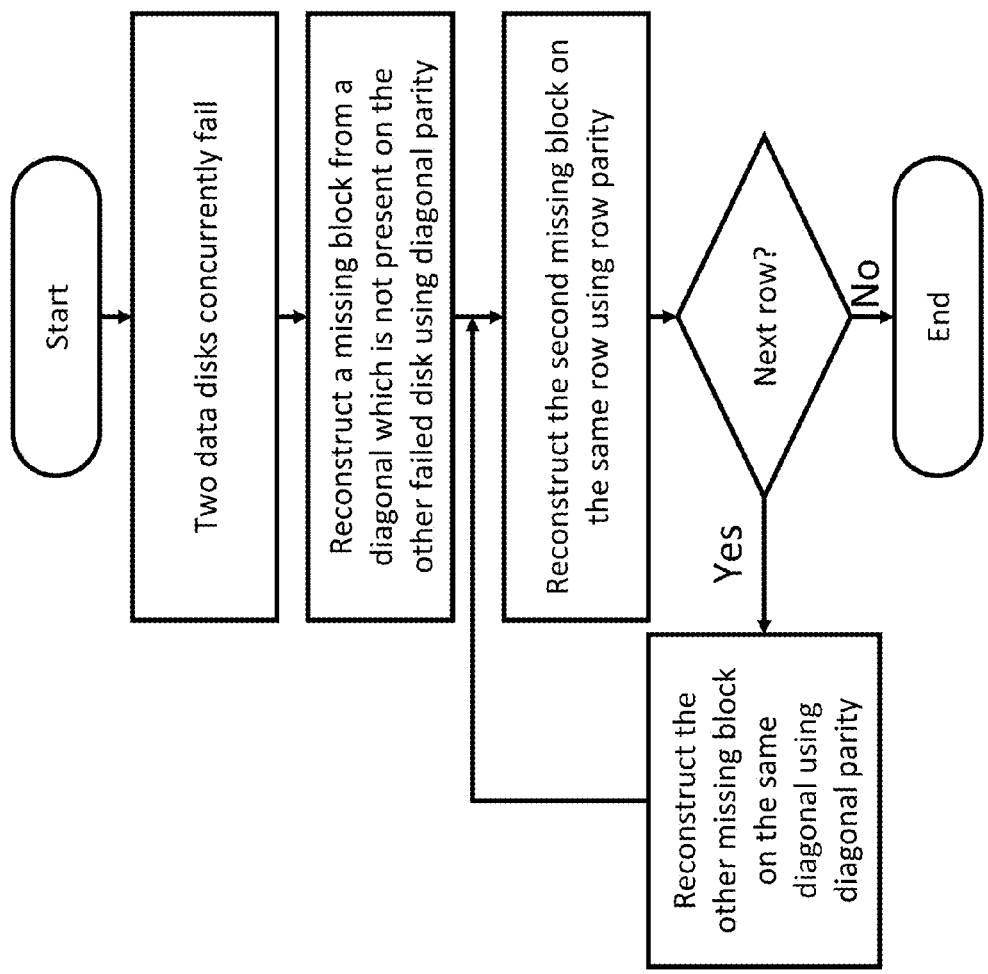
FIG. 18 is a simplified flow chart illustrating the process of recovering data following a double disk failure according to embodiments of the present invention.

Reference is now made to FIG. 18, which is a simplified flow chart illustrating a procedure for recovery following double disk failure. To rebuild two failed disks, we simply start from a diagonal which has a single representative on one of the failed columns, and reconstruct the first missing block. We then utilize that block to reconstruct the block residing on the same row in the second failed disk, and continue iteratively. Rebuilding parity columns can be done by using the encoding procedure.

It is expected that during the life of a patent maturing from this application many relevant redundancy-based memory storage devices and updates of the RAID system will be developed and the scope of the term RAID is intended to include all such new technologies a priori.

The terms "comprises", "comprising", "includes", "including", "having" and their conjugates mean "including but not limited to".

The term consisting of means "including and limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A redundant array of independent disk (RAID) memory storage system comprising data storage blocks arranged in said array in a first plurality of data rows and a second plurality of data columns, wherein parity data is stored in additionally defined parity blocks, and wherein numbers of blocks in respective columns are different;

wherein at least some of said parity data is row parity data placed in a plurality of columns of row parity data wherein at least some of said parity data is diagonal parity data placed in diagonal parity blocks in a diagonal parity column, wherein the number of said data blocks comprising each row parity set is larger than the number of said data blocks comprising each diagonal parity set.

2. The RAID memory storage system of claim 1, wherein the said data storage blocks are arranged in at least two independent parity groups, wherein each said parity group has a plurality of said parity blocks and an equal number of parity sets comprising a subset of the said data storage blocks.

3. The RAID memory storage system of claim 1, wherein each said data block is present in exactly two said parity blocks.

4. The RAID memory storage system of claim 1, wherein at least some of said parity blocks are arranged in parity columns other than those containing respective data blocks, and wherein each remaining said parity block is placed in a column containing data blocks other than a column which contains respective data blocks of the respective parity block.

5. The RAID memory storage system of claim 1, wherein at least some of said parity data is row parity data placed in row parity blocks in at least one row parity column.

6. The RAID memory storage system of claim 1, wherein at least some of said parity data is diagonal parity data placed in diagonal parity blocks in a diagonal parity column.

7. The RAID memory storage system of claim 1, wherein at least some of said parity data is diagonal parity data placed in a column of diagonal parity data, said diagonal parity column comprising one more block than a number of said first plurality of data rows.

8. The RAID memory storage system of claim 1, wherein at least some of said parity data is row parity data placed in row parity blocks in at least one row parity column wherein at least some of said parity data is diagonal parity data placed in diagonal parity blocks in a diagonal parity column, wherein said data storage blocks are arranged with a blank diagonal, such that each data column sharing said blank diagonal has one less block than a number of said plurality of rows and said diagonal parity column has a number of blocks equal to said number of said first plurality of data rows.

9. The RAID memory storage system of claim 1, wherein said array comprises a plurality of solid state drives (SSD).

10. The RAID memory storage system of claim 1, wherein said second plurality of data columns equals a prime number and said first plurality of data rows is less than said second plurality of data columns.

11. The RAID memory storage system of claim 10, wherein said second plurality of data columns is equal to a number of disks allowed in said array, wherein at any given time an actual number of disks present is less than or equal to said allowed number of disks.

12. The RAID storage system of claim 10, further comprising a disk addition unit for adding a new disk to the array and maintaining a balance of parity blocks over said array, the disk addition unit being configured to migrate a selected row parity block to said new disk by retaining said row parity block at an original disk position and defining a zeroed block of data to receive future parity updates for said selected row parity block, said disk addition unit further configured to calculate a new diagonal parity block on said new disk.

13. The RAID storage system of claim 1, further comprising a single disk failure recovery unit configured to use row parity to recover a first plurality of lost data blocks and to use diagonal parity to recover remaining data blocks, thereby to use data blocks already read from said row parity recovery to calculate said diagonal parity recovery.

14. The RAID storage system of claim 1, further comprising a double disk failure recover unit, configured to recover a first block of a first lost disk in a first, and then succeeding ones, of said rows using diagonal parity and then to recover a first block of a second lost disk in said first row, and then succeeding rows using row parity data of said first row and then succeeding rows respectively.

15. The RAID storage system of claim 1, further comprising a data update unit for writing a new data block over an old data block, the data update unit configured to read said old data block, and existing parity data, write said new data block and XOR data of said old block with data of said new data block and said existing parity data to form new parity data.

16. A redundant array of independent disk (RAID) memory storage method comprising storing data storage blocks arranged in a first plurality of data rows and a second plurality of data columns, and storing parity data in additionally defined parity blocks, said columns being arranged such that numbers of blocks in respective columns are different;
wherein at least some of said parity data is row parity data placed in row parity blocks in a row parity column wherein at least some of said parity data is diagonal parity data placed in diagonal parity blocks in a diagonal parity column, the method comprising arranging said data storage blocks with a blank diagonal, such that each data column sharing said blank diagonal has one less block than a number of said plurality of rows and said diagonal parity column has a number of blocks equal to said number of said first plurality of data rows.

17. The RAID memory storage method of claim 16, wherein at least some of said parity data is row parity data placed in row parity blocks in a row parity column.

18. The RAID memory storage method of claim 16, wherein at least some of said parity data is diagonal parity data placed in diagonal parity blocks in a diagonal parity column.

19. The RAID memory storage method of claim 16, wherein at least some of said parity data is diagonal parity data placed in a column of diagonal parity data, said diagonal parity column comprising one more block than a number of said first plurality of data rows.

20. The RAID memory storage method of claim 16, wherein said array comprises a plurality of solid state drives (SSD).

21. The RAID memory storage method of claim 16, wherein said second plurality of data columns equals a prime number and said first plurality of data rows is one less than said second plurality of data columns.

22. The RAID memory storage method of claim 21, wherein said second plurality of data columns is equal to a number of disks allowed in said array, and providing, at any given time, an actual number of disks which is less than or equal to said allowed number of disks.

23. The RAID storage method of claim 21, further comprising adding a new disk to the array and maintaining a balance of parity blocks over said array, the method comprising migrating a selected row parity block to said new disk by retaining said row parity block at an original disk position and defining a zeroed block of data to receive future parity updates for said selected row parity block, and calculating a new diagonal parity block on said new disk.

24. The RAID storage method of claim 16, further comprising, in the event of single disk failure, using row parity to recover a first plurality of lost data blocks and to use diagonal parity to recover remaining data blocks, thereby to use data blocks already read from said row parity recover to calculate said diagonal parity recovery.

25. The RAID storage method of claim 16, further comprising, in the event of double disk failure, recovering a first block of a first lost disk in a first, and then succeeding ones, of said rows using diagonal parity and then to recover a first block of a second lost disk in a said first row, and then succeeding rows using row parity data of said first row and then succeeding rows respectively.

26. The RAID storage method of claim 16, further comprising writing a new data block over an old data block, by reading said old data block and existing parity data, writing said new data block and XORing data of said old data block with data of said new data block and said existing parity data to form new parity data.

* * * * *